No. 868,722. PATENTED OCT. 22, 1907.
L. E. TANNER.
REEL.
APPLICATION FILED MAR. 9, 1907.

2 SHEETS—SHEET 1.

Witnesses:
M. G. Crozier
Charles A. Tanner

Inventor,
Louis E. Tanner,
by Harry K. Wallace
Atty.

No. 868,722.

PATENTED OCT. 22, 1907.

L. E. TANNER.
REEL.
APPLICATION FILED MAR. 9, 1907.

2 SHEETS—SHEET 2.

Witnesses:
M. G. Crozier.
Charles A. Tanner.

Inventor
Louis E. Tanner.
by Harry D. Wallace
Atty.

UNITED STATES PATENT OFFICE.

LOUIS E. TANNER, OF DOLGEVILLE, NEW YORK, ASSIGNOR OF ONE-HALF TO CHARLES A. TANNER, OF UTICA, NEW YORK.

REEL.

No. 868,722.          Specification of Letters Patent.          Patented Oct. 22, 1907.

Application filed March 9, 1907. Serial No. 361,491.

*To all whom it may concern:*

Be it known that I, LOUIS E. TANNER, a citizen of the United States, residing at Dolgeville, in the county of Herkimer and State of New York, have invented certain new and useful Improvements in Reels, of which the following is a specification.

This invention relates to improvements in reels, designed for use in connection with angling or fishing with rod-lines, and the invention relates particularly to a fishing-reel which may be attached to a rod or pole, in such manner that all the mechanism for operating and controlling the same is inclosed and confined in a detachable part or holder.

The object of the invention is to provide a fishing-reel, wherein the construction and arrangement of the parts is such that, none of the mechanical parts are exposed to contact with external objects, or dirt, or other deteriorating influences.

A further object is to provide a reel of the class and dispose the same in a casing which is readily attached to the butt of a rod or pole, and which is adapted to form a convenient and serviceable handle therefor.

A further object is to provide a reel and an actuating mechanism therefor, which may be readily applied to and removed from the free end of the casing or handle, without requiring the latter to be separated from the rod or pole. And a further object is to provide a reel which is simple, compact, durable and inexpensive, and which will withstand considerable use and abuse and not get out of order.

The invention consists principally in providing a hollow tubular casing, fitted at one end with means for connecting it to the butt of a rod or pole, the other end forming a receptacle or shell in which the reel and related parts are inclosed.

The invention further consists in providing a screw-cap to inclose the outer end of said shell, and which supports one end of the reel and also carries all of the working parts of the device. And the invention further consists of a complete click and drag mechanism, together with simple means for operating said parts, and also the reel.

Other features and parts of the invention will be fully understood from the detail description which follows, and by reference to the accompanying drawings, which form a part of this specification, and in which—

Figure 1:
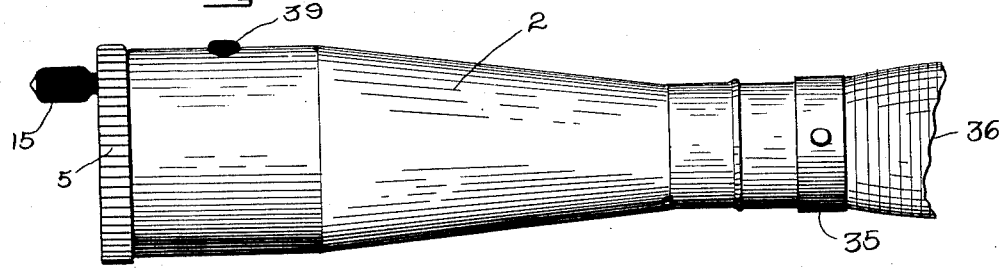
Figure 2:
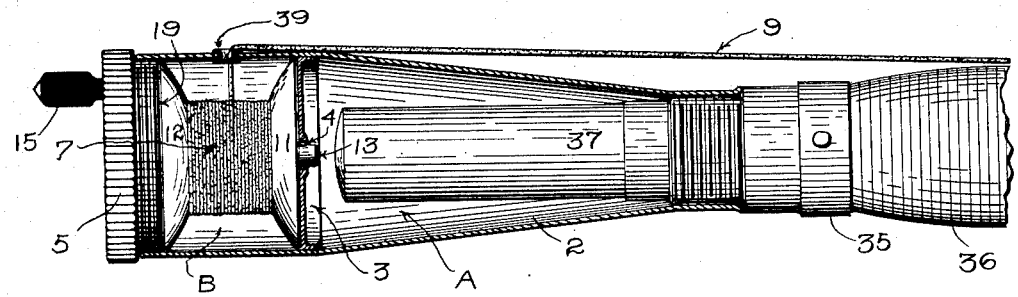
Figure 3:
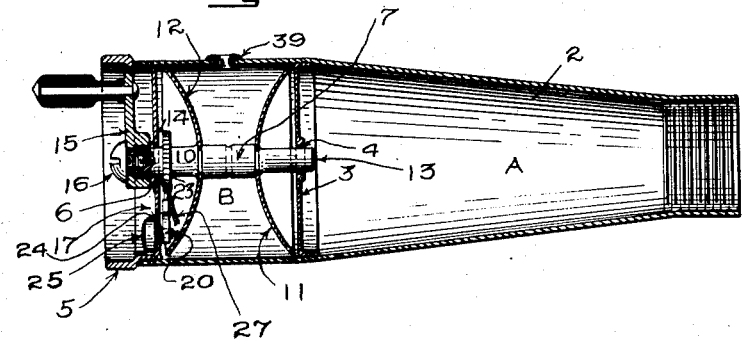
Figure 4:
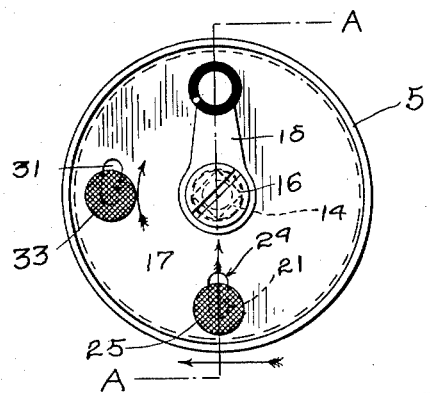
Figure 5:
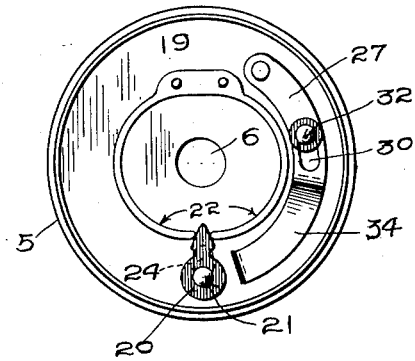
Figure 6:
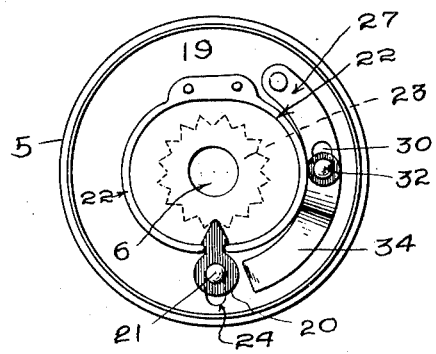
Figure 7:
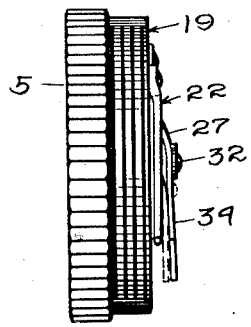

Figure 1 is a side elevation of the handle or casing in which the reel is disposed, showing the same attached to the rod or pole; also showing the handle of the operating crank. Fig. 2 is a longitudinal section, substantially on the line A—A of Fig. 4, showing the casing or shell in section, and the reel, line and other parts in full lines. Fig. 3 is a complete longitudinal section of the device, on the same line as Fig. 2, showing the working parts in section; the line and rod being omitted. Fig. 4 is an enlarged front end view, showing the crank for operating the reel; also showing means for shifting the click and drag mechanism. Fig. 5 is an enlarged inner face view of the screw-cap, showing the click and drag parts—the drag set for action, and the click released. Fig. 6 is an enlarged inner face view of the screw-cap, showing the click in engagement with the gear, and the drag in released position. Fig. 7 is an enlarged side elevation of the screw-cap, showing the drag mechanism in two positions—the full lines showing the drag set for action, the dotted lines showing the drag released; also showing one of the springs for balancing the click.

Similar characters of reference are assigned to corresponding parts throughout the several views.

In the drawings, 2 represents a hollow casing or shell, preferably made of light weight tubing or sheet metal, in the form shown, with the outer end expanded to receive and inclose the reel mechanism, and the inner end contracted to form suitable connection with a fish-rod. The casing 2 in this form also provides a convenient handle or grip for the fishing outfit.

3 represents a transverse wall or partition rigidly secured in said casing in a manner to divide the interior of the casing into two compartments A and B, as shown; the said partition having a small perforation 4.

5 represents a circular screw-cap, preferably made of brass or other suitable metal, and made to fit and close the outer end of the casing 2, the open end of compartment or chamber B being internally threaded to receive said cap. The peripheral edge or rim of the cap projects slightly beyond the outer surface of the casing, and it is also knurled to facilitating removing the cap by hand. Cap 5 has a central perforation 6 which is disposed in line with perforation 4.

7 represents a reel or bobbin upon which the fish-line 9 is wound. The reel or spool 7 is formed rigidly upon a shaft or spindle 10, the ends of which project from the concaved flanges or heads 11 and 12, to form trunnions or journals 13 and 14, which are adapted to operably fit the perforations 4 and 6 respectively. The journal 14 is squared at its outer end to receive a crank 15, which is employed to operate reel 7 in either direction, to effect the winding or unwinding of the line 9 by hand. The crank-arm has a square hole through it to receive the square end of shaft 10, and a screw 16 threaded into the end of the shaft holds the crank 15 in place. When the crank is attached to shaft 10 as described, the reel becomes connected with the cap 5 in such manner that these parts may be handled as one part, and the detaching of the cap from the handle 2 will remove all of the working parts of the device. The outer face of the cap 5 is formed into a deep recess 17, in which are located the crank 15 and other adjusting parts. The inner face 19 of the cap is preferably flat, and upon this face is mounted a click member comprising an arrow-pointed part 20, which is pivoted upon and movable with a pin or stud 21, and a pair of integrally formed springs 22, which normally hold the click 20 in a central position when it is set for action, (see Fig. 6) and at the same time allows the click to vibrate from side to side when in action. These springs also serve to hold the click in the same relative position, when it is thrown out of engagement with the second click member comprising a circular rack or gear 23 (see Figs. 3 and 5). The pin 21 passes through and plays in the slot 24, cut through the face of cap 5, and a shift button 25 is fitted to the outer end of the pin and disposed in the recess 17, as shown in Figs. 3 and 4, both of which show the shift button 25 in the position to throw and hold the click out of engagement with the rack or gear 23, by means of which the click alarm is sounded. Gear 23 is attached rigidly to shaft 10 of the reel and rotates therewith, and when the click is on, if the reel is rotated in either direction the click member 20 will be made to vibrate and produce a sharp clicking sound.

27 represents a crescent shaped drag or brake member, preferably made of spring metal in the form shown in Figs. 5, 6 and 7. One end of the drag spring 27 is riveted to the inner face of cap 5, and near the middle of the said part or slot 30 is formed, which registers with another slot 31 in cap 5, and pin 32 and a shift button 33, are provided for adjusting or shifting the drag into or out of engagement with the reel 7. These shifting parts are substantially the same as those described for the click. The outer end of the drag member 27 is free, and is bent outwardly to form a pawl 34, which will bear against the concaved head 12 of the reel and exert a dragging or braking effect to retard the movement of the reel, in either direction, when button 33 is shifted to the position shown in Figs. 4 and 5, and also by the full lines in Fig. 7.

Figs. 2 and 3 show the reel disposed in the casing or hand-grip 2, in such a manner that the reel head 12 almost bears against the inner face of cap 5, and in this position the free end of the drag may be thrown in or out of frictional engagement or contact with the reel-head at will, by the manipulation of the shift button or knob 33.

The dotted lines in Fig. 7 show the drag out of contact or action; this condition being brought about by shifting button 33 to the position shown in Fig. 6.

35 represents a socket or ferrule, preferably made of the same kind of metal as the casing or handle 2, and having its inner end externally threaded for connecting with the handle. This socket or ferrule is intended to be fitted to the butt-end of the fish-rod or pole 36, and by reason of the threading referred to, the pole and the handle may be detached or joined whenever desired. In order to make a stronger connection between the handle and the pole, an elongated hollow cap 37 is fitted to the inner end of socket 35, into which a longer portion of the pole may be inserted. The connection between these two parts is made by means of threads the same as described for connecting the handle and the socket.

39 represents a gromet or eyelet fitted in a small circular hole in the casing 2, leading to the reel chamber B, for use in passing the line from the reel to rod 36, as illustrated in Figs. 1, 2 and 3.

In practice the socket 35 may be permanently secured to the butt of a wooden or metallic pole or rod, and then the handle 2 containing the reel and related parts may be attached or detached whenever desired, for packing or other purposes, without disturbing the connection between the socket and rod. New lines, or lines of different kinds may be applied to the reel by simply unscrewing and renewing the cap 5, which will carry with it the reel and all of its actuating and controlling mechanism.

When a person using tackle having my device attached is ready to cast, he will shift button 25 to the position shown in Fig. 4. This will throw the click out of engagement with the circular rack 23, and it will then stand in the position shown in Fig. 5 and will let the line run out freely. At the same time he will shift button 33 in the direction which will depress the drag-pawl 34, as shown in Fig. 6, and by the dotted lines in Fig. 7 which will free the drag from engagement with flange or head 12 of the reel, and the reel will revolve freely, as the line runs out. As soon as the line has been cast, shift 25 may be moved to the other end of slot 24, which will throw the click into engagement with the rack 23, as shown in Fig. 6. When a bite or strike occurs, button 33 may be reshifted in slots 30 and 31, which will throw the drag into engagement with the reel-head 12, and it will exert a tension or brake upon the reel and thus prevent a fish from carrying or drawing the line out as freely as if the brake were not on. The crank for operating the reel, and the click and drag shifts being disposed in the recessed cap at the extreme end of the handle, provides a very simple and convenient method of operating and controlling my fishing device.

All of the working parts of my device being concealed in chamber B of the casing, and in the recessed portion of the cap, are protected from dirt, as well as from contact with a boat or other object which might clog, break or otherwise damage the same while being employed on a fishing trip.

The construction and operation of my device is extremely simple, and it is capable of being applied more readily and with less labor and at less cost, than any device of the class known to me.

It is obvious that some changes or modifications of the details may be made, without departing from my invention, and I therefore do not confine myself to the precise construction and arrangement of the same as herein shown and described.

Having thus described my invention, what I claim as new and desire to secure by Letters Patent, is—

1. A device of the class described, comprising a hollow casing divided into two compartments, one compartment adapted to receive the butt of a fish rod, the second compartment adapted to receive and to conceal a reel, a recessed screw-cap closing the outer end of said second compartment, a reel having one end journaled in said screw-cap, a crank for operating said reel disposed in the recess of said screw-cap, a click mechanism disposed between said screw-cap and said reel, a shift button for operating the click disposed in said recess; and a drag or brake carried by said cap, substantially as described.

2. A device of the class described, comprising a hollow casing interiorly divided to form two compartments, one of the said compartments fitted with a threaded socket adapted to receive the butt of a rod or pole, a screw-cap to close the outer end of said second compartment, the outer face of said cap having a recess, the inner face being flat, a reel disposed in said second compartment pivotally connected with said screw-cap, a crank to operate said reel disposed in said recess, a click member operable with said reel, a shiftable click member carried by said screw-cap, and a drag or brake adjustably mounted on the inner face of said screw-cap, substantially as described.

3. In a device of the class described, the combination with a hollow tubular casing interiorly divided to form an inner and an outer compartment, and a pole or rod connected with the said inner compartment, of a reel disposed in said outer compartment, a screw-cap having a hollow outer face fitting one end of said outer compartment adapted to form a bearing for the outer end of said reel, a crank for operating said reel disposed in the outer face of said screw-cap, a click mechanism carried by said cap, a shift button for operating said click disposed in the outer face of said cap, and a drag mechanism mounted on the inner face of said cap, adapted to be thrown into or out of engagement with said reel, substantially as described.

4. A device of the class described, comprising a tubular casing having an inner and an outer chamber, a rod connecting with the inner chamber, a reel operably disposed in the outer chamber, a hollow faced cap closing the outer end of said casing and supporting one end of said reel, a crank for operating said reel disposed in the outer face of said cap, a click mechanism carried by said cap and said reel, and a drag or brake mounted on the inner face of said cap, substantially as described.

In testimony whereof I affix my signature in presence of two witnesses.

LOUIS E. TANNER.

Witnesses:
GEO. CRONIN,
GEO. R. BULLOCK.